(12) United States Patent
Bajpai et al.

(10) Patent No.: US 10,949,914 B2
(45) Date of Patent: Mar. 16, 2021

(54) IMMERSIVE AND ARTIFICIAL INTELLIGENCE BASED RETAIL

(71) Applicant: ACCENTURE GLOBAL SOLUTIONS LIMITED, Dublin (IE)

(72) Inventors: Dhruv Bajpai, Bangalore (IN); Trilok Rangan, Bangalore (IN); Trilokesh Satpathy, Bangalore (IN); Vibhu Saujanya Sharma, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/031,719

(22) Filed: Jul. 10, 2018

(65) Prior Publication Data
US 2019/0019242 A1  Jan. 17, 2019

(30) Foreign Application Priority Data
Jul. 12, 2017  (IN) .............................. 201711024499

(51) Int. Cl.
*G06Q 30/06* (2012.01)
*G06N 5/02* (2006.01)
(Continued)

(52) U.S. Cl.
CPC ......... *G06Q 30/0643* (2013.01); *G06F 3/011* (2013.01); *G06F 3/013* (2013.01);
(Continued)

(58) Field of Classification Search
CPC ...................... G06Q 30/0643; G06Q 30/0603; G06F 3/013; G06F 3/017; G06F 3/0482; G06N 5/02; G06T 19/006
See application file for complete search history.

(56) References Cited

U.S. PATENT DOCUMENTS 8,275,590 B2 * 9/2012 Szymczyk ......... G06Q 30/0603
345/418
2010/0241525 A1  9/2010 Aguera y Arcas et al.
(Continued)

OTHER PUBLICATIONS

Julian Horsey, "Augmented Reality App Allows You to Try Clothes Before you Buy In a Virtual Dressing Room (video)", published on Geeky-gadgets.com Sep. 29, 2010, 12 pages. <https://www.geeky-gadgets.com/augmented-reality-app-allows-you-to-try-clothes-before-you-buy-in-a-virtual-dressing-room-29/09/2010/>.

*Primary Examiner* — Yu Chen
(74) *Attorney, Agent, or Firm* — Mannava & Kang, P.C.

(57) ABSTRACT

In some examples, immersive and artificial intelligence based retail may include ascertaining attributes associated with a user, identifying a device to display an augmented reality display, a virtual reality display, and/or a mixed reality display, and generating, based on the ascertained attributes and for display on the identified device, a virtual store including a plurality of clothing articles. A clothing article may be selected from the plurality of clothing articles, and based on the selection of the clothing article, a design, a color combination, a texture, and/or a print pattern may be generated based on the clothing article. Further, immersive and artificial intelligence based retail may include generating a display of a plurality of three-dimensional hologram images of the user wearing the clothing article, and determining personalized clothing articles for the user based on selection of a clothing article from the displayed plurality of three-dimensional hologram images.

15 Claims, 14 Drawing Sheets

(51) Int. Cl.
  *G06F 3/01*    (2006.01)
  *G06T 19/00*   (2011.01)
  *G06K 9/00*    (2006.01)
  *G06F 3/0482*      (2013.01)

(52) U.S. Cl.
  CPC ........... *G06K 9/00671* (2013.01); *G06N 5/02* (2013.01); *G06Q 30/0603* (2013.01); *G06T 19/00* (2013.01); *G06T 19/006* (2013.01); *G06F 3/017* (2013.01); *G06F 3/0482* (2013.01); *G06K 9/00389* (2013.01); *G06K 9/00597* (2013.01); *G06T 2210/16* (2013.01)

(56)           References Cited

U.S. PATENT DOCUMENTS

| | | | |
|---|---|---|---|
| 2014/0035913 A1* | 2/2014  | Higgins    | G06T 17/00 345/420 |
| 2014/0291396 A1* | 10/2014 | Molisimo   | G06K 7/10881 235/383 |
| 2015/0186785 A1* | 7/2015  | Thieberger | G06Q 10/063 706/12 |
| 2016/0035132 A1* | 2/2016  | Shuster    | G06T 19/006 345/633 |
| 2016/0284017 A1* | 9/2016  | Almog      | G06Q 30/0643 |
| 2016/0371768 A1* | 12/2016 | Crow       | G06Q 30/0643 |
| 2018/0047192 A1* | 2/2018  | Kristal    | G06T 11/60 |
| 2019/0102706 A1* | 4/2019  | Frank      | G06Q 10/063 |
| 2019/0244407 A1* | 8/2019  | Wiesel     | G06K 9/00369 |
| 2019/0259190 A1* | 8/2019  | Kristal    | G06Q 30/0643 |
| 2019/0266663 A1* | 8/2019  | Keeler     | G06Q 30/0643 |

* cited by examiner

110

116

1000

ASCERTAIN, BY A USER ANALYZER EXECUTED BY AT LEAST ONE HARDWARE PROCESSOR, A PLURALITY OF ATTRIBUTES ASSOCIATED WITH A USER
1002

IDENTIFY, BY A VIRTUAL STORE GENERATOR THAT IS EXECUTED BY THE AT LEAST ONE HARDWARE PROCESSOR, A DEVICE TO DISPLAY AT LEAST ONE OF AN AUGMENTED REALITY DISPLAY, A VIRTUAL REALITY DISPLAY, OR A MIXED REALITY DISPLAY
1004

GENERATE, BY THE VIRTUAL STORE GENERATOR THAT IS EXECUTED BY THE AT LEAST ONE HARDWARE PROCESSOR, BASED ON THE ASCERTAINED PLURALITY OF ATTRIBUTES ASSOCIATED WITH THE USER AND FOR DISPLAY ON THE IDENTIFIED DEVICE, A VIRTUAL STORE INCLUDING A PLURALITY OF CLOTHING ARTICLES
1006

ASCERTAIN, BY A CLOTHING SELECTOR THAT IS EXECUTED BY THE AT LEAST ONE HARDWARE PROCESSOR, SELECTION OF A CLOTHING ARTICLE FROM THE PLURALITY OF CLOTHING ARTICLES
1008

GENERATE, BY THE CLOTHING SELECTOR THAT IS EXECUTED BY THE AT LEAST ONE HARDWARE PROCESSOR, BASED ON THE SELECTION OF THE CLOTHING ARTICLE, AT LEAST ONE OF A DESIGN, A COLOR COMBINATION, A TEXTURE, OR A PRINT PATTERN BASED ON THE CLOTHING ARTICLE
1010

GENERATE, BY A HOLOGRAM GENERATOR THAT IS EXECUTED BY THE AT LEAST ONE HARDWARE PROCESSOR, BASED ON THE AT LEAST ONE OF THE DESIGN, THE COLOR COMBINATION, THE TEXTURE, OR THE PRINT PATTERN BASED ON THE CLOTHING ARTICLE, AND FOR THE IDENTIFIED DEVICE, A DISPLAY OF A PLURALITY OF THREE-DIMENSIONAL HOLOGRAM IMAGES OF THE USER WEARING THE AT LEAST ONE OF THE DESIGN, THE COLOR COMBINATION, THE TEXTURE, OR THE PRINT PATTERN
1012

ASCERTAIN, BY AN ARTIFICIAL INTELLIGENCE CONTROLLER THAT IS EXECUTED BY THE AT LEAST ONE HARDWARE PROCESSOR, SELECTION OF A CLOTHING ARTICLE FROM THE DISPLAYED PLURALITY OF THREE-DIMENSIONAL HOLOGRAM IMAGES OF THE USER WEARING THE AT LEAST ONE OF THE DESIGN, THE COLOR COMBINATION, THE TEXTURE, OR THE PRINT PATTERN
1014

DETERMINE, BY THE ARTIFICIAL INTELLIGENCE CONTROLLER THAT IS EXECUTED BY THE AT LEAST ONE HARDWARE PROCESSOR, PERSONALIZED CLOTHING ARTICLES FOR THE USER BASED ON THE SELECTION OF THE CLOTHING ARTICLE FROM THE DISPLAYED PLURALITY OF THREE-DIMENSIONAL HOLOGRAM IMAGES OF THE USER WEARING THE AT LEAST ONE OF THE DESIGN, THE COLOR COMBINATION, THE TEXTURE, OR THE PRINT PATTERN
1016

GENERATE, BY A CLOTHING ARTICLE GENERATOR THAT IS EXECUTED BY THE AT LEAST ONE HARDWARE PROCESSOR, BASED ON THE DETERMINED PERSONALIZED CLOTHING ARTICLES FOR THE USER, AT LEAST ONE OF THE DETERMINED PERSONALIZED CLOTHING ARTICLES
1018

*FIG. 10 (Cont.)*

IMMERSIVE AND ARTIFICIAL INTELLIGENCE BASED RETAIL

PRIORITY

This application is a Non-Provisional Application of commonly assigned and co-pending India Provisional Application Serial Number 201711024499, filed Jul. 12, 2017, the disclosure of which is hereby incorporated by reference in its entirety.

BACKGROUND

In a retail environment, a designer may design different types of clothing articles that are sold to a user, for example, via a "brick and mortar" setting, via an e-commerce setting, etc. Once the clothing articles are designed, in the "brick and mortar" setting, the user may select certain ones of the clothing articles, try the clothing articles, and purchase certain ones of the selected clothing articles as needed. In an e-commerce setting, the user may select certain ones of the clothing articles, try the clothing articles upon receipt, and keep or return certain ones of the selected clothing articles.

BRIEF DESCRIPTION OF DRAWINGS

Features of the present disclosure are illustrated by way of example and not limited in the following figure(s), in which like numerals indicate like elements, in which:

FIG. 10 illustrates a flowchart of an example method for immersive and artificial intelligence based retail in accordance with an example of the present disclosure.

DETAILED DESCRIPTION

Figure 1:
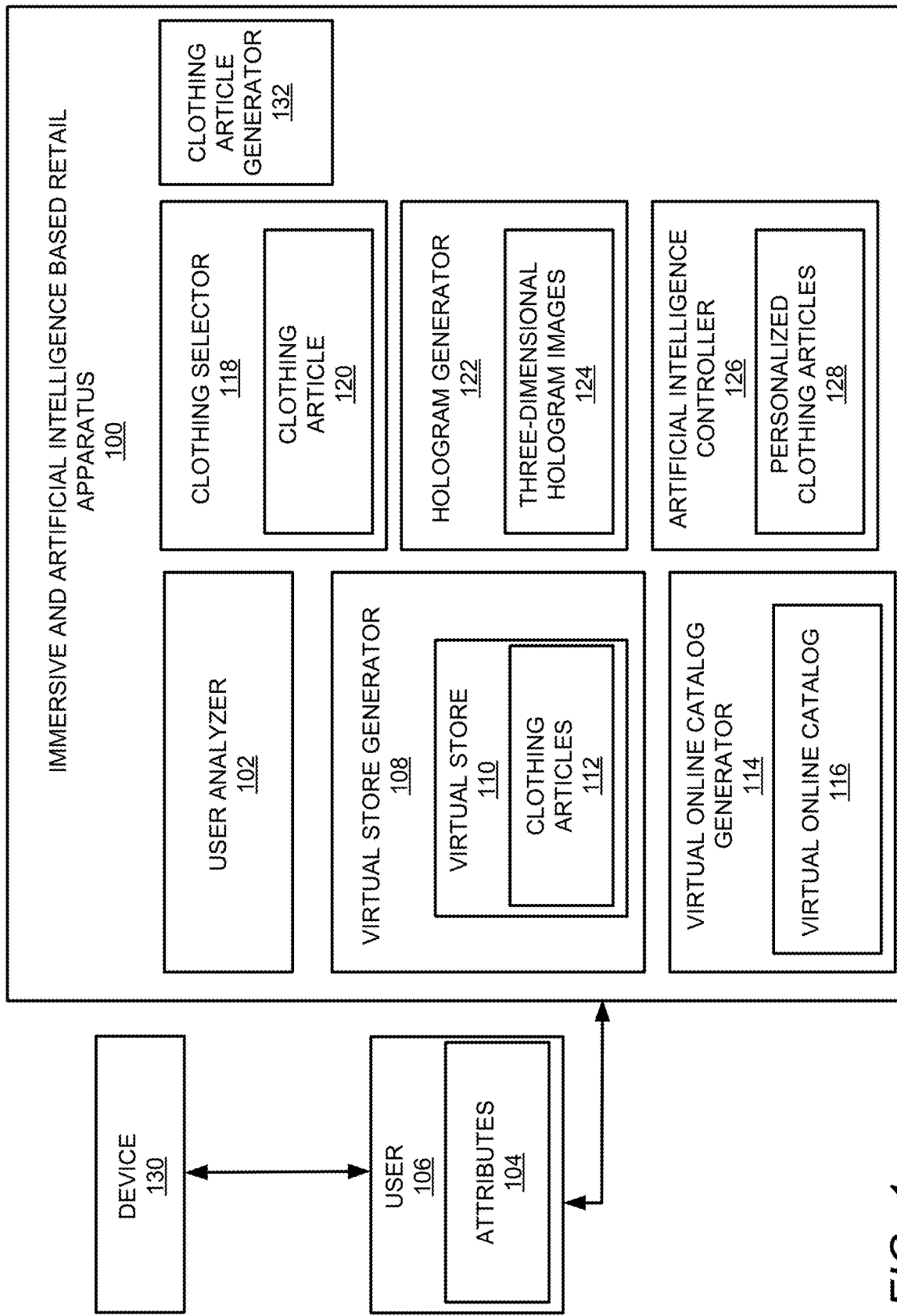
FIG. 1 illustrates a layout of an immersive and artificial intelligence based retail apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Immersive and artificial intelligence based retail apparatuses, methods for immersive and artificial intelligence based retail, and non-transitory computer readable media having stored thereon machine readable instructions to provide immersive and artificial intelligence based retail are disclosed herein. The apparatuses, methods, and non-transitory computer readable media disclosed herein provide for immersive and artificial intelligence based retail by utilizing, for example, augmented reality, virtual reality, and/or mixed reality technologies to visualize different chosen combinations of clothing articles, patterns, colors, and/or accessories (chosen from a virtual store and/or a virtual online catalog), and superimposed on top of three dimensional (3D) rendered images of the user. The virtual online catalog and/or the virtual store may be customized based, for example, on artificial intelligence technologies utilizing personal profile information for a user, as well as user preferences.

With respect to the retail environment, technical challenges exist in that customers at stores may make multiple visits to a trial room, trying multiple clothing articles, and accessory combinations, before making a choice. In this regard, it is technically challenging to provide a mechanism where a customer can try a range of clothing combinations to make a choice that would be ideal. From a fashion designer perspective, fashion designers try to keep evolving their designs, and command a premium during a next season. In this case, it is technically challenging for designers to produce ideal designs in view of the multitude of combinations, apparel categories, new design concepts, color combinations, textures, print patterns, combinations of clothing articles, etc.

In order to addresses at least the aforementioned technical challenges, the apparatuses, methods, and non-transitory computer readable media disclosed herein may include ascertaining a plurality of attributes associated with a user, and generating, based on the ascertained plurality of attributes associated with the user, a virtual store (and/or a virtual online catalog) including a plurality of clothing articles. The apparatuses, methods, and non-transitory computer readable media disclosed herein may include ascertaining selection of a clothing article from the plurality of clothing articles, and generating, based on the selection of the clothing article, a design, a color combination, a texture, and/or a print pattern based on the clothing article. Further, the apparatuses, methods, and non-transitory computer readable media disclosed herein may include generating, based on the design, the color combination, the texture, and/or the print pattern based on the clothing article, a display of a plurality of three-dimensional hologram images of the user wearing the design, the color combination, the texture, and/or the print pattern, and determining personalized clothing articles for the user based on selection of a clothing article from the displayed plurality of three-dimensional hologram images of the user wearing the design, the color combination, the texture, and/or the print pattern.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example immersive and artificial intelligence based retail apparatus (hereinafter also referred to as "apparatus 100").

Referring to FIG. 1, the apparatus 100 may include a user analyzer 102 that is executed by at least one hardware processor (e.g., the hardware processor 902 of FIG. 9, and/or the hardware processor 1104 of FIG. 11) to ascertain a plurality of attributes 104 associated with a user 106.

A virtual store generator 108 that is executed by at least one hardware processor (e.g., the hardware processor 902 of FIG. 9, and/or the hardware processor 1104 of FIG. 11) is to identify a device 130 to display an augmented reality display, a virtual reality display, and/or a mixed reality display. Further, the virtual store generator 108 may generate, based on the ascertained plurality of attributes 104 associated with the user 106 and for display on the identified device 130, a virtual store 110 including a plurality of clothing articles 112.

A virtual online catalog generator 114 that is executed by at least one hardware processor (e.g., the hardware processor 902 of FIG. 9, and/or the hardware processor 1104 of FIG. 11) is to generate, based on the ascertained plurality of attributes 104 associated with the user 106, a virtual online catalog 116 including the plurality of clothing articles 112, or a limited number of the plurality of clothing articles 112. For example, with respect to the attribute of gender, the plurality of clothing articles 112 may correspond to the gender of the user 106. With respect to the attribute of location, the plurality of clothing articles 112 may correspond to typical clothing articles worn by users at the specified location.

A clothing selector 118 that is executed by at least one hardware processor (e.g., the hardware processor 902 of FIG. 9, and/or the hardware processor 1104 of FIG. 11) may ascertain selection of a clothing article 120 from the plurality of clothing articles 112. Further, the clothing selector 118 may generate, based on the selection of the clothing article, a design, a color combination, a texture, and/or a print pattern based on the clothing article. In this regard, the clothing selector 118 may generate the design, the color combination, the texture, and/or the print pattern based, for example, on pre-specified templates associated with a type of the clothing article. According to another example, a model may be utilized to generate the design, the color combination, the texture, and/or the print pattern based on the clothing article. For example, as disclosed herein with reference to FIG. 5, a model for coats may be used to generate the design, the color combination, the texture, and/or the print pattern based on the clothing article that includes coats. The model may also account for user interaction with different types of clothing articles, as well as previous user history with different types of clothing articles. For example, the model for coats may of a particular color may account for user interaction with different types of vests of a particular color.

According to examples disclosed herein, the clothing selector 118 may ascertain selection of the clothing article from the plurality of clothing articles by ascertaining, based on a gaze, a hand gesture, and/or a menu option, selection of the clothing article from the plurality of clothing articles.

A hologram generator 122 that is executed by at least one hardware processor (e.g., the hardware processor 902 of FIG. 9, and/or the hardware processor 1104 of FIG. 11) is to generate, based on the design, the color combination, the texture, and/or the print pattern based on the clothing article, and for the identified device 130, a display of a plurality of three-dimensional hologram images 124 of the user 106 wearing the design, the color (or design) combination, the texture, and/or the print pattern.

According to examples disclosed herein, an attribute of the plurality of attributes associated with the user 106 may include an image of a face of the user. In this regard, the hologram generator 122 may generate, based on the design, the color combination, the texture, and/or the print pattern based on the clothing article, and for the identified device 130, the display of the plurality of three-dimensional hologram images of the user wearing the design, the color combination, the texture, and/or the print pattern by generating, based on the design, the color combination, the texture, and/or the print pattern based on the clothing article, and for the identified device 130, the display of the plurality of three-dimensional hologram images that include the face of the user and the user wearing the design, the color combination, the texture, and/or the print pattern.

According to examples disclosed herein, the hologram generator may generate, based on the design, the color combination, the texture, and/or the print pattern based on the clothing article, and for the identified device, the display of the plurality of three-dimensional hologram images of the user wearing the design, the color combination, the texture, and/or the print pattern by performing a three-dimensional scan of the user 106, and generating, based on the design, the color combination, the texture, and/or the print pattern based on the clothing article, and for the identified device and the three-dimensional scan of the user, the display of the plurality of three-dimensional hologram images of the user wearing the design, the color combination, the texture, and/or the print pattern.

An artificial intelligence controller 126 that is executed by at least one hardware processor (e.g., the hardware processor 902 of FIG. 9, and/or the hardware processor 1104 of FIG. 11) is to ascertain selection of a clothing article from the displayed plurality of three-dimensional hologram images 124 of the user 106 wearing the design, the color combination, the texture, and/or the print pattern. Further, the artificial intelligence controller 126 may determine personalized clothing articles 128 for the user 106 based on the selection of the clothing article from the displayed plurality of three-dimensional hologram images 124 of the user 106 wearing the design, the color combination, the texture, and/or the print pattern.

According to examples disclosed herein, the hologram generator 122 may identify a most viewed image of a clothing article by determining an attraction factor as a frequency of returning a gaze of the user at a clothing article relative to the plurality of clothing articles. Further, the artificial intelligence controller 126 may ascertain the selection of the clothing article from the displayed plurality of three-dimensional hologram images 124 of the user wearing the design, the color combination, the texture, and/or the print pattern, and determine personalized clothing articles for the user based on the selection of the clothing article from the displayed plurality of three-dimensional hologram images of the user wearing the design, the color combination, the texture, and/or the print pattern by ascertaining the selection of the clothing article based on the most viewed image of the clothing article, and determining the personalized clothing articles for the user based on the selection of the clothing article from the displayed plurality of three-dimensional hologram images of the user wearing the design, the color combination, the texture, and/or the print pattern.

According to examples disclosed herein, the hologram generator 122 may identify a most viewed image of a clothing article by determining an affinity factor as a ratio of time spent by the user gazing at a clothing article relative to the plurality of clothing articles. Further, the artificial intelligence controller 126 may ascertain the selection of the clothing article from the displayed plurality of three-dimensional hologram images 124 of the user wearing the design, the color combination, the texture, and/or the print pattern, and determine personalized clothing articles for the user based on the selection of the clothing article from the displayed plurality of three-dimensional hologram images of the user wearing the design, the color combination, the texture, and/or the print pattern by ascertaining the selection of the clothing article based on the most viewed image of the clothing article, and determining the personalized clothing articles for the user based on the selection of the clothing article from the displayed plurality of three-dimensional hologram images of the user wearing the design, the color combination, the texture, and/or the print pattern.

A clothing article generator 132 that is executed by at least one hardware processor (e.g., the hardware processor 902 of FIG. 9, and/or the hardware processor 1104 of FIG. 11) is to generate, based on the determined personalized clothing articles for the user 106, one (or a plurality) of the determined personalized clothing articles. The clothing article generator 132 may include, for example, a machine, a robot, or another type of device that may receive instructions from the artificial intelligence controller 126 as to the attributes and specifications of the determined personalized clothing articles 128, and generate, based on the received instructions one (or a plurality) of the determined personalized clothing articles.

Figure 2:
FIG. 2 illustrates a virtual store to illustrate operation of the immersive and artificial intelligence based retail apparatus of FIG. 1 in accordance with an example of the present disclosure.

FIG. 2 illustrates a virtual store to illustrate operation of the apparatus 100 in accordance with an example of the present disclosure.

Referring to FIG. 2, the virtual store generator 108 is to generate the virtual store 110 that includes, for example, virtual clothing articles. In this regard, the user 106 may visit the virtual store 110 to view all available clothing articles 112. For example, the virtual store 110 may include the available clothing articles 112 displayed in a hanging configuration, folded, stacked, etc. The user 106 may view the available clothing articles 112, for example, on a virtual reality and/or mixed reality device such as a HoloLens, or another such device.

Figure 3:
FIG. 3 illustrates a virtual online catalog to illustrate operation of the immersive and artificial intelligence based retail apparatus of FIG. 1 in accordance with an example of the present disclosure.

FIG. 3 illustrates a virtual online catalog to illustrate operation of the apparatus 100 in accordance with an example of the present disclosure.

Referring to FIG. 3, the virtual online catalog generator 114 is to generate the virtual online catalog 116 that includes, for example, virtual clothing articles. For example, the virtual online catalog 116 may include the available clothing articles displayed in a hanging configuration. The clothing articles displayed in the virtual online catalog 116 may be the same or fewer than the clothing articles 112.

The virtual online catalog generator 114 as well as the virtual store generator 108 may provide for voice enabled price details for selection of clothing articles. Further, the virtual online catalog generator 114 as well as the virtual store generator 108 may provide for comparison of different designs of clothing articles along with price information.

The virtual online catalog generator 114 as well as the virtual store generator 108 may utilize artificial intelligence to provide a personalized virtual online catalog. Further, different customers may be categorized based on their likes, dislikes, and other attributes of the clothing articles and other fashion products (e.g., accessories such as belts, caps, etc.).

The virtual online catalog generator 114 as well as the virtual store generator 108 may facilitate the creation and display of new designs of the clothing articles. For example, the virtual online catalog generator 114 as well as the virtual store generator 108 may facilitate the creation and display of designs of the clothing articles in three-dimensional space to new customers.

Figure 4:
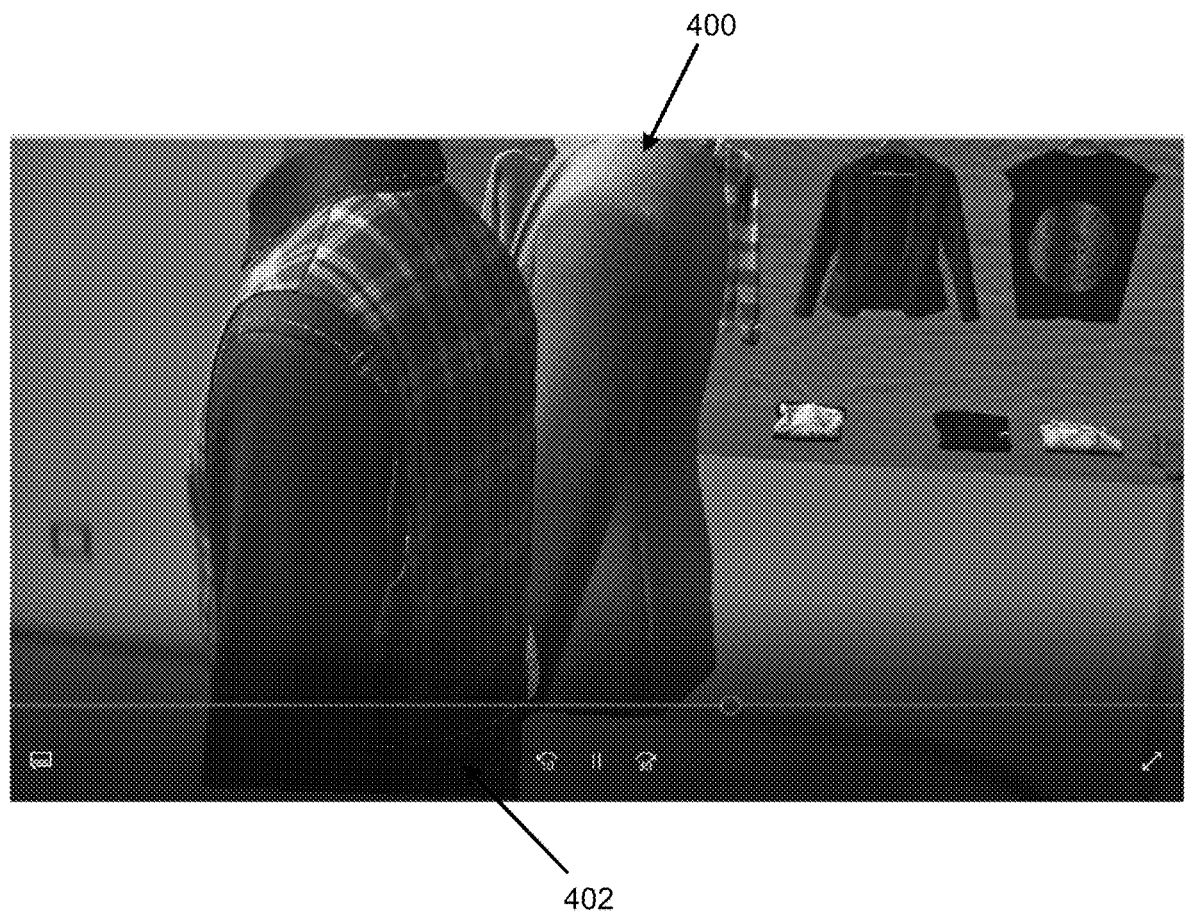
FIG. 4 illustrates trying of multiple designs from the virtual store of FIG. 2 or the virtual online catalog of FIG. 3 to illustrate operation of the immersive and artificial intelligence based retail apparatus of FIG. 1 in accordance with an example of the present disclosure.

FIG. 4 illustrates trying of multiple designs from the virtual store of FIG. 2 or the virtual online catalog of FIG. 3 to illustrate operation of the apparatus 100 in accordance with an example of the present disclosure.

Referring to FIG. 4, the clothing selector 118 is to provide for the user 106 to try multiple design concepts, color combinations, textures, print patterns, and combinations of the clothing articles 112. The user 106 may also choose the clothing articles 112 they prefer using, for example, hand gestures. For example, the user 106 may use hand gestures to select a suit at 400, and different aspects of the suit, such as lapel style, vent style, buttoning style, pocket style, etc. Similarly, the user 106 may use hand gestures to select a vest at 402, and different aspects of the vest, such as lapel style, back style, bottom style, buttoning style, pocket style, etc.

Figure 5:
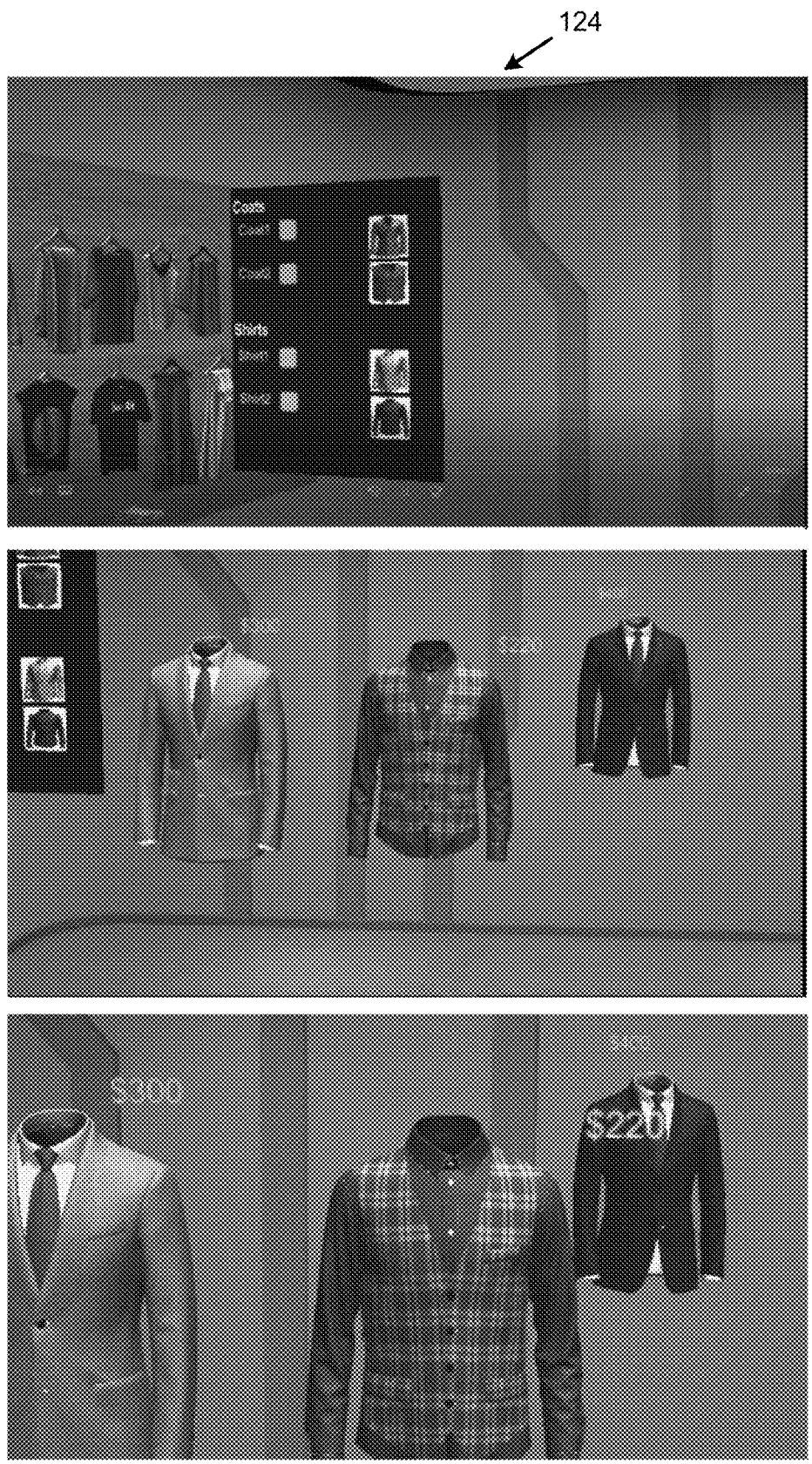
FIG. 5 illustrates creation of hologram images to illustrate operation of the immersive and artificial intelligence based retail apparatus of FIG. 1 in accordance with an example of the present disclosure.
Figure 6:
FIG. 6 illustrates creation of hologram images to illustrate operation of the immersive and artificial intelligence based retail apparatus of FIG. 1 in accordance with an example of the present disclosure.

FIGS. 5 and 6 illustrate creation of hologram images to illustrate operation of the apparatus 100 in accordance with an example of the present disclosure.

Referring to FIGS. 5 and 6, the hologram generator 122 is to generate three dimensional (3D) hologram images, utilizing, for example, virtual reality and/or mixed reality. In this regard, the hologram generator 122 is to create any clothing article combination superimposed on the user's face. The 3D hologram images may be based on an analysis of different images of the user 106 from different angles (e.g., front, left/right side, back, etc.).

The artificial intelligence controller 126 is to utilize artificial intelligence to prompt personalized clothing articles. That is, the artificial intelligence controller 126 is to utilize artificial intelligence to prompt personalized clothing articles based, for example, on customer (e.g., user) segment, likings, and/or personal clothing article fitment. The user 106 may choose a correct clothing article with the correct combination for the user 106.

The artificial intelligence controller 126 may operate in conjunction with a head tracking system that identifies which clothing articles or combinations consumers like or spend more time on. In this regard, data with respect to the head tracking may be received as input to the artificial intelligence controller 126 for contextualization and personalization.

The hologram generator 122 may utilize mixed reality to provide for the visualization of different chosen combinations of clothing articles, patterns, and/or colors, and accessories, picked from the virtual online catalog 116 as described with reference to FIG. 3, and superimposition on top of a three-dimensional rendered image of the user 106 as shown in FIG. 6.

The hologram generator 122 may provide for visualization of clothing article combinations in three dimensions with images of the user 106 standing side by side as shown in FIG. 6. The user 106 may rotate and resize any image by hand gestures. For example, a hand gesture where the user 106 brings their thumb and forefinger together may reduce an image size, and vice versa to enlarge the image size.

The hologram generator 122 may provide a display that includes a variety of clothing articles 112 placed on the user 106 so that the user 106 may make the correct choice, as opposed to having to visit a trial room multiple times.

The hologram generator 122 may identify clothing articles 112 with the correct fit based on a three-dimensional scan of the user 106.

The hologram generator 122 may utilize a HoloLens user sentiment feature to identify a most viewed image of a clothing article. For example, the HoloLens user sentiment feature may use head movement, gaze, voice, and/or gestures to understand what the user 106 is interested in. These aspects may intuitively give a designer an idea about the most appreciated design.

According to an example, the hologram generator 122 may determine an attraction factor At(mi) as a frequency of returning a gaze at a clothing article. In this regard, the hologram generator 122 may set M={m1, m2, ... mn} to be the set of merchandize (e.g., clothing articles) around the user 106, and turn_to(mi) be a method/counter that is incremented each instance the user 106 turns to (e.g., gaze arrives at) mi from any other clothing article. Then At(mi) may be defined as the {turn_to(mi)/Σ<j=1 to n>(turn_to($m_j$))}.

According to an example, the hologram generator 122 may determine an affinity factor Af(mi) as the ratio of time spent gazing at a clothing article. In this regard, the hologram generator 122 may set M={m1, m2, ... mn} to be the set of merchandize (e.g., clothing articles) around the user 106, and time_at(mi) be a method/counter that is incremented for each second the user 106 spends gazing at mi. Then Af(mi) may be defined as the {time_at(mi)/Σ<j=1 to n>(time_at(mj))}.

Figure 7:
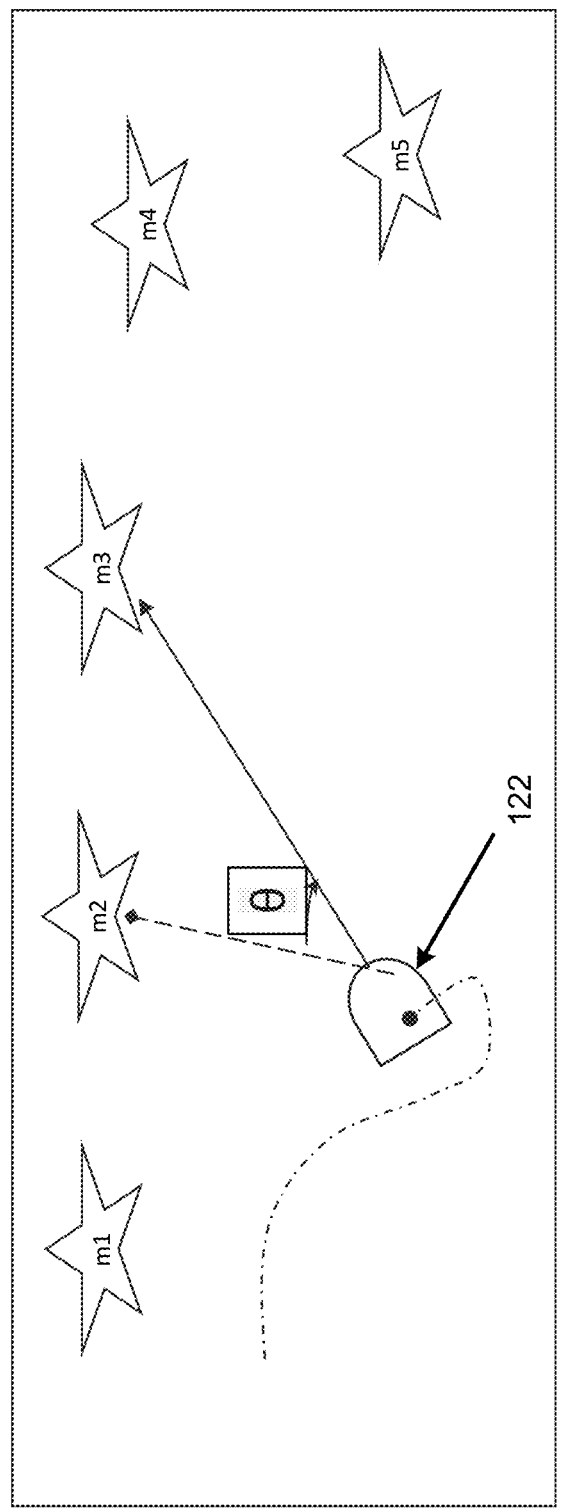
FIG. 7 illustrates determination of angles and time values related to turn_to( ) and time_at( ) based on placement of clothing articles in an environment in accordance with an example of the present disclosure.

With respect to determination of turn_to( ) and time_at( ), extended reality devices such as HoloLens may provide spatial environment information as well as information regarding the movement and directionality of the headset in that environment. The movement of the headset (e.g., direction and distance) may be assumed to be the movement of the user's head without loss of generality. In this regard, as shown in FIG. 7, the hologram generator 122 may determine angles (e.g., different values of $\ominus$) and time values related to turn_to( ) and time_at( ) based on the placement of clothing articles in the environment using, for example, Euclidean geometry. In this regard, the device 130 may output data on where the user's gaze is on the spatial map as well as holograms placed in the space around the user. For example, the device 130 may utilize the position and orientation of the user's head to determine their gaze vector. As the user is looking around, this trajectory may be intersected, for example, with its own holograms and with the spatial mapping mesh to determine what virtual or real-world object the user may be looking at. In this regard, given the user's position and two points on which the gaze intersects at different points in time, Euclidean geometry (e.g., utilizing trigonometry) may be used to determine the angle $\ominus$ of movement of gaze between those points.

The hologram generator 122 may provide dashboards on capture of likes, dislikes, clothing article combinations sold, attributes sold, and attributes returned.

The hologram generator 122 may provide real time or near real time feedback from designers to sample customers, using, for example, virtual reality, mixed reality, and/or live streaming.

The hologram generator 122 may provide for customers to preview an entire available product line in a short time duration before making a correct choice. A customer (e.g., the user) may try the best suited clothing articles from the comfort of their home, office, etc., by visualizing what looks goods on them and fits on them perfectly as well.

The hologram generator 122 may reduce and/or eliminate, based on the display of the user 106 wearing different clothing articles, wear and tear of clothing articles.

Figure 8:
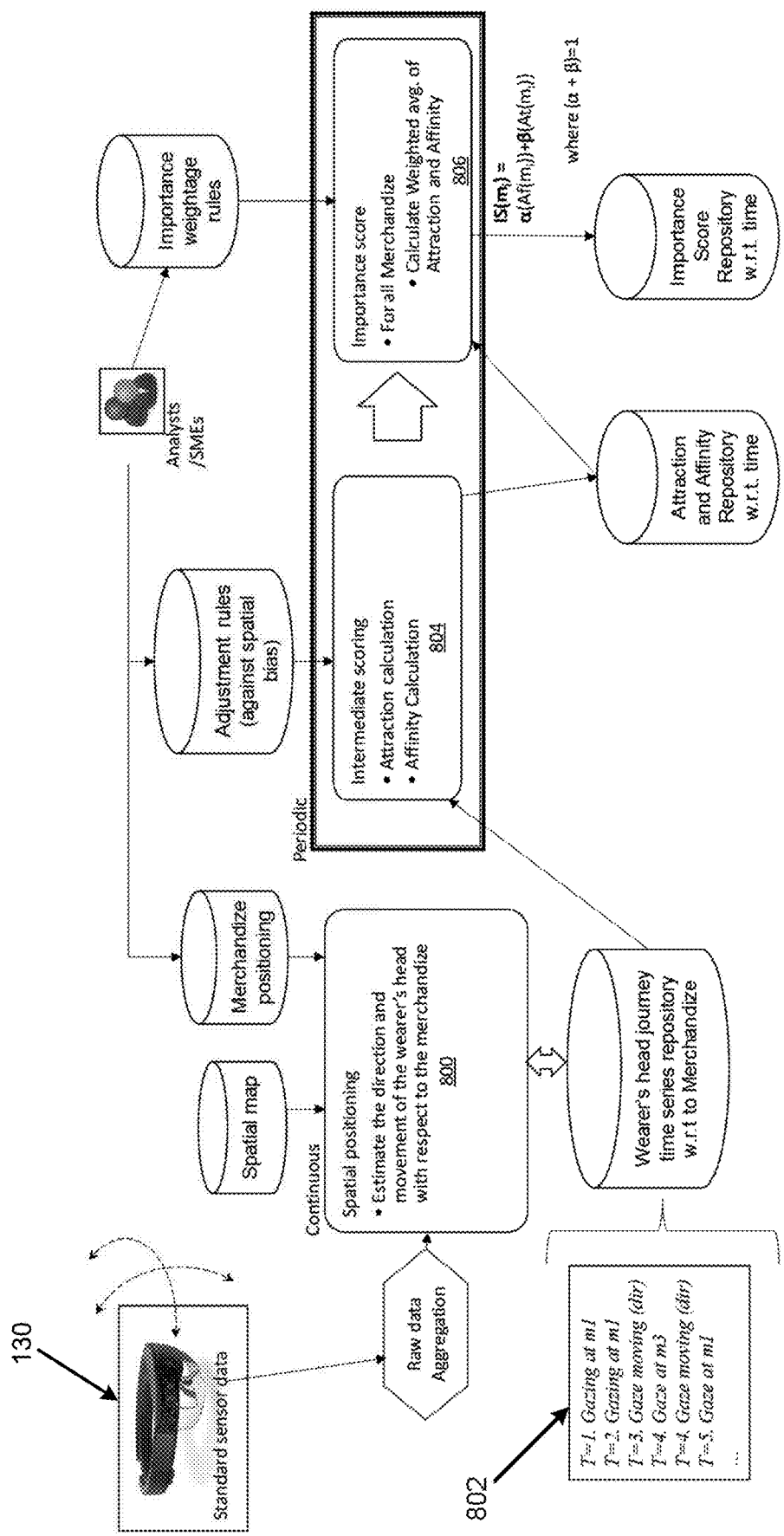
FIG. 8 illustrates identification of user head movement, gaze, and dynamic adjustments to determine the importance or interest of a virtual model in the HoloLens view in accordance with an example of the present disclosure.

FIG. 8 illustrates identification of user head movement, gaze, and dynamic adjustments to determine the importance or interest of a virtual model in the HoloLens view in accordance with an example of the present disclosure.

Referring to FIG. 8, the artificial intelligence controller 126 may determine personalized clothing articles for the user 106 based on selection of a clothing article from the displayed plurality of three-dimensional hologram images 124 of the user 106 wearing the design, the color combination, the texture, and/or the print pattern. In this regard, in order to determine personalized clothing articles, at 800, the artificial intelligence controller 126 may determine spatial positioning by determining the direction and movement of the user's head with respect to clothing articles. The artificial intelligence controller 126 may receive as input a spatial map and merchandise positioning (e.g., clothing articles positioning). The spatial map may include a mesh representation of the surroundings of the user who is wearing the device 130. With respect to spatial positioning, the merchandise may be positioned in the spatial map and the location (spatial position) of various holograms of the merchandise may be known. The spatial map and merchandise positioning may be used to determine time series data on where the user's gaze was. For example, the spatial positioning may include a time series of the user's head journey with respect to the merchandise. For example, as shown at 802, at time T=1, the user 106 may be gazing at m1, at time T=2, the user 106 may be gazing at m1, etc. At 804, the artificial intelligence controller 126 may perform intermediate scoring to determine attraction and affinity as disclosed herein with respect to the attraction factor At(mi) and the affinity factor Af(mi). At 806, the artificial intelligence controller 126 may determine an important score (IS) for all of the merchandise (e.g., each article of clothing) by ascertaining an importance weight for each piece of the merchandise, and determining a weighted average of attraction and affinity. The importance score may be represented as $IS(m_i)=\alpha(Af(m_i))+\beta(At(m_i))$, where $(\alpha+\beta)=1$. Importance weightage rules may be used to provide more weightage to either affinity or attraction scores. The weightages α and β with respect to the affinity and attraction scores respectively may range from 0 to 1, and the sum of the weightages α and β may be 1. According to an example, if all of the weightage is assigned to affinity and none of the weightage is assigned to attraction, then α will be 1 and β will be 0. The importance scores of different merchandise may be periodically sorted to determine which merchandise is to be prioritized for further actions (e.g., offers, recommendations, etc.).

Thus, the artificial intelligence controller 126 may provide personalized recommendations based on head tracking and personalization, where raw data from the device 130, as shown in FIG. 8, may be input to the artificial intelligence controller 126. The raw data may include information with respect to where a user's gaze is directed to a hologram, or a direction of the user's gaze in an environment of the merchandise. The artificial intelligence controller 126 may utilize hot and cold view streams to understand user interests to generate custom recommendation modules (at load and run time). Further, the hologram generator 122 may generate designs based on the selection of a clothing article. The hologram generator 122 may also generate three-dimensional models dynamically using multiple pictures and deferred loading using markers.

Figure 9:
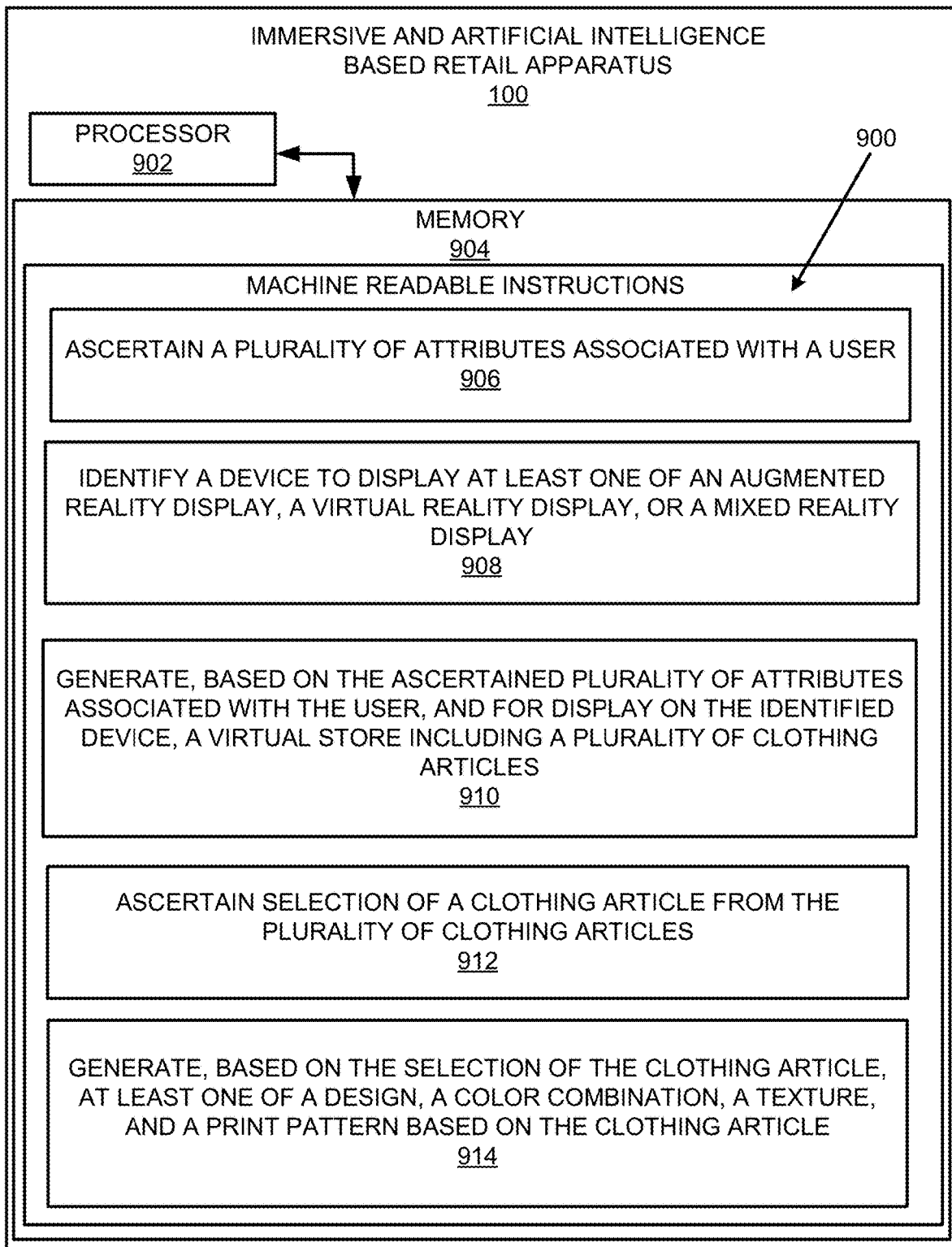
FIG. 9 illustrates an example block diagram for immersive and artificial intelligence based retail in accordance with an example of the present disclosure.
Figure 9:
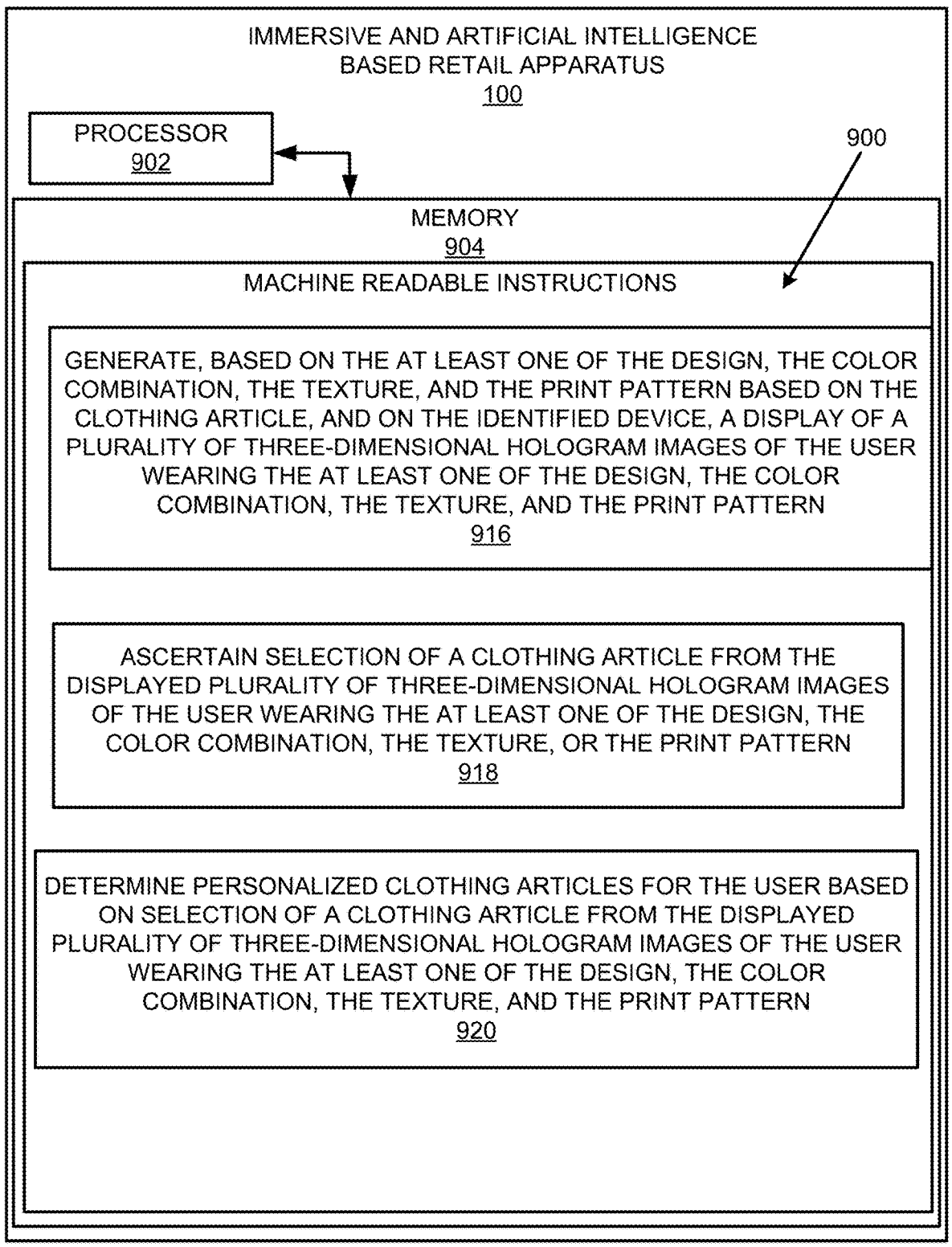
Figure 11:
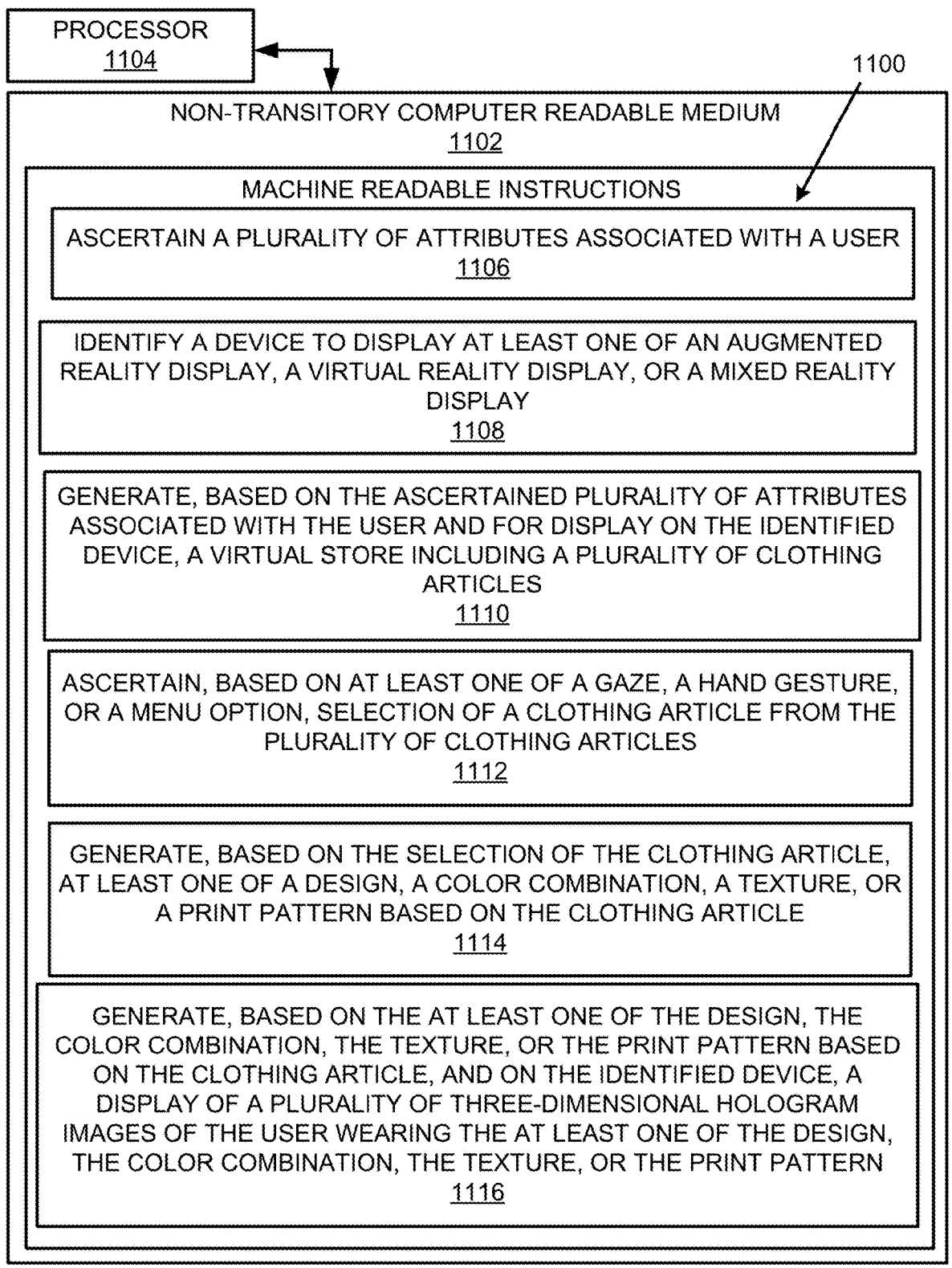
FIG. 11 illustrates a further example block diagram for immersive and artificial intelligence based retail in accordance with another example of the present disclosure.
Figure 11:
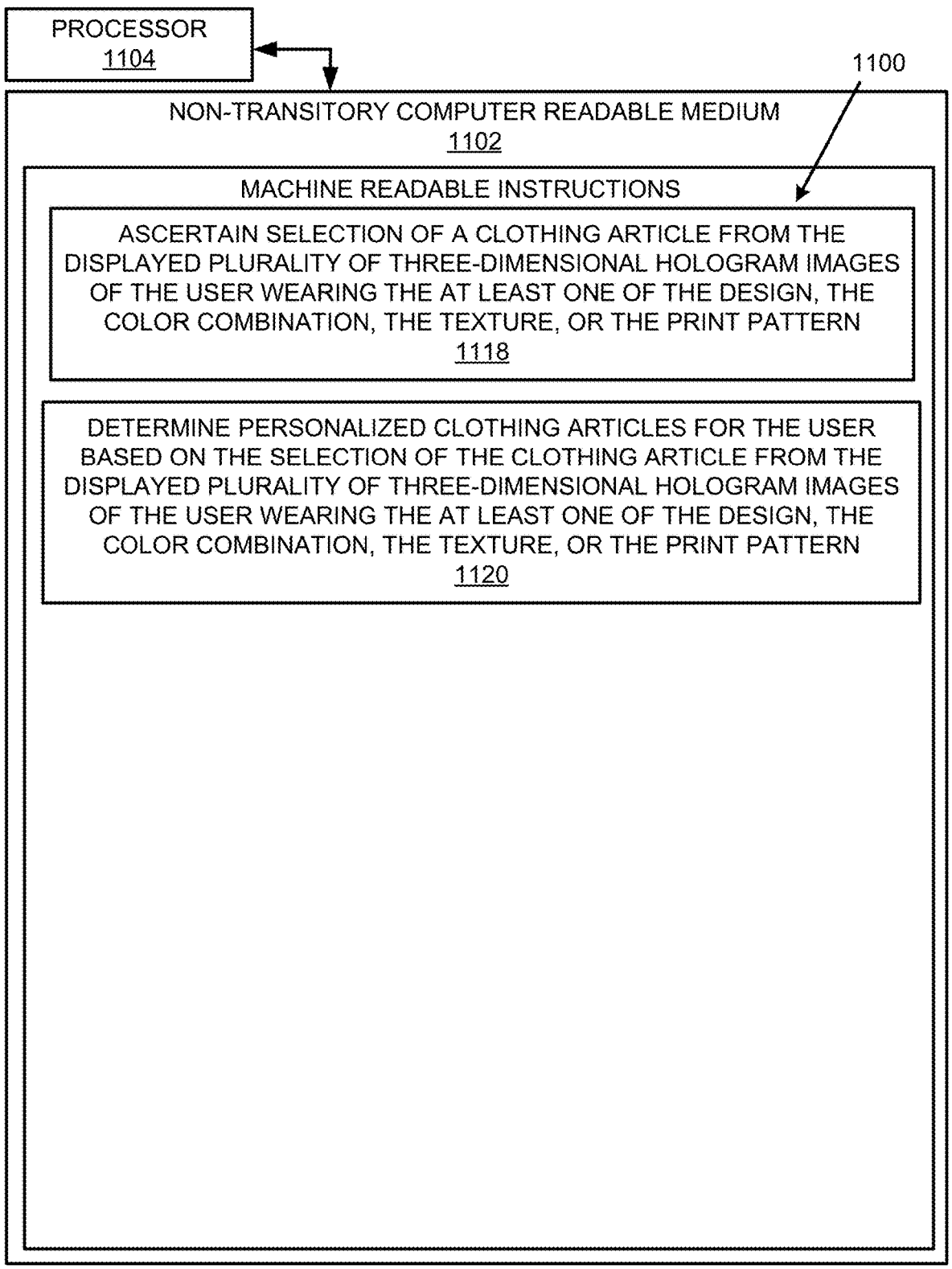

FIGS. 9-11 respectively illustrate an example block diagram 900, a flowchart of an example method 1000, and a further example block diagram 1100 for immersive and artificial intelligence based retail, according to examples. The block diagram 900, the method 1000, and the block diagram 1100 may be implemented on the apparatus 100 described above with reference to FIG. 1 by way of example and not of limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent an example method for immersive and artificial intelligence based retail, and the steps of the method. FIG. 11 may represent a non-transitory computer readable medium 1102 having stored thereon machine readable instructions to provide immersive and artificial intelligence based retail according to an example. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to ascertain (e.g., by a user analyzer 102 executed by at least one hardware processor), a plurality of attributes 104 associated with a user.

The processor 902 may fetch, decode, and execute the instructions 908 to identify (e.g., by a virtual store generator 108 that is executed by the at least one hardware processor) a device 130 to display an augmented reality display, a virtual reality display, and/or a mixed reality display.

The processor 902 may fetch, decode, and execute the instructions 910 to generate (e.g., by a virtual store generator 108 that is executed by the at least one hardware processor), based on the ascertained plurality of attributes 104 associated with the user and for display on the identified device 130, a virtual store including a plurality of clothing articles.

The processor 902 may fetch, decode, and execute the instructions 912 to ascertain (e.g., by a clothing selector 118 that is executed by the at least one hardware processor), selection of a clothing article from the plurality of clothing articles.

The processor 902 may fetch, decode, and execute the instructions 914 to generate (e.g., by the clothing selector 118 that is executed by the at least one hardware processor), based on the selection of the clothing article, a design, a color combination, a texture, and/or a print pattern based on the clothing article.

The processor 902 may fetch, decode, and execute the instructions 916 to generate (e.g., by a hologram generator 122 that is executed by the at least one hardware processor), based on the design, the color combination, the texture, and/or the print pattern based on the clothing article, and on the identified device 130, a display of a plurality of three-dimensional hologram images of the user wearing the design, the color combination, the texture, and/or the print pattern.

The processor 902 may fetch, decode, and execute the instructions 918 to ascertain (e.g., by an artificial intelligence controller 126 that is executed by the at least one hardware processor), selection of a clothing article from the displayed plurality of three-dimensional hologram images of the user wearing the design, the color combination, the texture, and/or the print pattern.

The processor 902 may fetch, decode, and execute the instructions 920 to determine (e.g., by an artificial intelligence controller 126 that is executed by the at least one hardware processor), personalized clothing articles for the user based on selection of the clothing article from the displayed plurality of three-dimensional hologram images of the user wearing the design, the color combination, the texture, and/or the print pattern.

Referring to FIGS. 1-8 and 10, and particularly FIG. 10, for the method 1000, at block 1002, the method may include ascertaining, by a user analyzer 102 executed by at least one hardware processor, a plurality of attributes 104 associated with a user.

At block 1004, the method may include identifying, by a virtual store generator 108 that is executed by the at least one hardware processor, a device 130 to display at least one of an augmented reality display, a virtual reality display, or a mixed reality display.

At block 1006, the method may include generating, by the virtual store generator 108 that is executed by the at least one hardware processor, based on the ascertained plurality of attributes 104 associated with the user and for display on the identified device 130, a virtual store including a plurality of clothing articles.

At block 1008, the method may include ascertaining, by a clothing selector 118 that is executed by the at least one hardware processor, selection of a clothing article from the plurality of clothing articles.

At block 1010, the method may include generating, by the clothing selector 118 that is executed by the at least one hardware processor, based on the selection of the clothing article, at least one of a design, a color combination, a texture, or a print pattern based on the clothing article.

At block 1012, the method may include generating, by a hologram generator 122 that is executed by the at least one hardware processor, based on the at least one of the design, the color combination, the texture, or the print pattern based on the clothing article, and for the identified device 130, a display of a plurality of three-dimensional hologram images of the user wearing the at least one of the design, the color combination, the texture, or the print pattern.

At block 1014, the method may include ascertaining, by an artificial intelligence controller 126 that is executed by the at least one hardware processor, selection of a clothing article from the displayed plurality of three-dimensional hologram images of the user wearing the at least one of the design, the color combination, the texture, or the print pattern.

At block 1016, the method may include determining, by an artificial intelligence controller 126 that is executed by the at least one hardware processor, personalized clothing articles for the user based on selection of the clothing article from the displayed plurality of three-dimensional hologram images of the user wearing the design, the color combination, the texture, and/or the print pattern.

At block 1018, the method may include generating, by a clothing article generator 132 that is executed by the at least one hardware processor, based on the determined personalized clothing articles for the user, at least one of the determined personalized clothing articles.

Referring to FIGS. 1-8 and 11, and particularly FIG. 11, for the block diagram 1100, the non-transitory computer readable medium 1102 may include instructions 1106 to ascertain a plurality of attributes 104 associated with a user.

The processor 1104 may fetch, decode, and execute the instructions 1108 to identify a device 130 to display at least one of an augmented reality display, a virtual reality display, or a mixed reality display.

The processor 1104 may fetch, decode, and execute the instructions 1110 to generate, based on the ascertained plurality of attributes 104 associated with the user and for display on the identified device 130, a virtual store including a plurality of clothing articles.

The processor 1104 may fetch, decode, and execute the instructions 1112 to ascertain, based on at least one of a gaze, a hand gesture, or a menu option, selection of a clothing article from the plurality of clothing articles.

The processor 1104 may fetch, decode, and execute the instructions 1114 to generate, based on the selection of the clothing article, a design, a color combination, a texture, and/or a print pattern based on the clothing article.

The processor 1104 may fetch, decode, and execute the instructions 1116 to generate, based on the at least one of the design, the color combination, the texture, or the print pattern based on the clothing article, and on the identified device 130, a display of a plurality of three-dimensional hologram images of the user wearing the at least one of the design, the color combination, the texture, or the print pattern.

The processor 1104 may fetch, decode, and execute the instructions 1118 to ascertain selection of a clothing article from the displayed plurality of three-dimensional hologram images of the user wearing the at least one of the design, the color combination, the texture, or the print pattern.

The processor 1104 may fetch, decode, and execute the instructions 1120 to determine personalized clothing articles for the user based on the selection of the clothing article from the displayed plurality of three-dimensional hologram images of the user wearing the at least one of the design, the color combination, the texture, or the print pattern.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An immersive and artificial intelligence based retail apparatus comprising:
   a user analyzer, executed by at least one hardware processor, to
     ascertain a plurality of attributes associated with a user;
   a virtual store generator, executed by the at least one hardware processor, to
     identify a device to display at least one of an augmented reality display, a virtual reality display, or a mixed reality display,
     generate, based on the ascertained plurality of attributes associated with the user and for display on the identified device, a virtual store including a plurality of clothing articles, and
     generate, for the virtual store, voice enabled price details with respect to the plurality of clothing articles;
   a clothing selector, executed by the at least one hardware processor, to
     ascertain, based on a direction of a gaze, selection of a clothing article from the plurality of clothing articles, and
     generate, based on the selection of the clothing article, at least one of a design, a color combination, a texture, or a print pattern based on the clothing article;
   a hologram generator, executed by the at least one hardware processor, to
     generate, based on the at least one of the design, the color combination, the texture, or the print pattern based on the clothing article, and on the identified device, a display of a plurality of three-dimensional hologram images of the user wearing the at least one of the design, the color combination, the texture, or the print pattern, and
     identify a most viewed image of the clothing article by
       determining an attraction factor as a frequency of returning the gaze of the user in a direction of the clothing article relative to the plurality of clothing articles, and
       determining an affinity factor as a ratio of time spent by the user gazing in the direction of the clothing article relative to the plurality of clothing articles; and
   an artificial intelligence controller, executed by the at least one hardware processor, to
     ascertain selection of the clothing article from the displayed plurality of three-dimensional hologram images of the user wearing the at least one of the design, the color combination, the texture, or the print pattern, determine personalized clothing articles for the user based on the selection of the clothing article from the displayed plurality of three-dimensional hologram images of the user wearing the at least one of the design, the color combination, the texture, or the print pattern, ascertain an importance weight for the clothing article associated with the determined attraction factor and the determined affinity factor, determine, based on the importance weight, an importance score for the clothing article associated with the determined attraction factor and the determined affinity factor as a weighted average of the attraction factor and the affinity factor, and prioritize, for the user, based on the importance score, the clothing article associated with the determined attraction factor and the determined affinity factor relative to the plurality of clothing articles.

2. The apparatus according to claim 1, further comprising:
a clothing article generator, executed by the at least one hardware processor, to
generate at least one of the determined personalized clothing articles.

3. The apparatus according to claim 1, further comprising:
a virtual online catalog generator, executed by the at least one hardware processor, to
generate, based on the ascertained plurality of attributes associated with the user, a virtual online catalog including the plurality of clothing articles displayed on at least one page of the virtual online catalog.

4. The apparatus according to claim 1, wherein an attribute of the plurality of attributes associated with the user includes an image of a face of the user, and wherein the hologram generator is to generate, based on the at least one of the design, the color combination, the texture, or the print pattern based on the clothing article, and on the identified device, the display of the plurality of three-dimensional hologram images of the user wearing the at least one of the design, the color combination, the texture, or the print pattern by:
generating, based on the at least one of the design, the color combination, the texture, or the print pattern based on the clothing article, and on the identified device, the display of the plurality of three-dimensional hologram images that include the face of the user and the user wearing the at least one of the design, the color combination, the texture, or the print pattern.

5. The apparatus according to claim 1, wherein the hologram generator is to generate, based on the at least one of the design, the color combination, the texture, or the print pattern based on the clothing article, and on the identified device, the display of the plurality of three-dimensional hologram images of the user wearing the at least one of the design, the color combination, the texture, or the print pattern by:
performing a three-dimensional scan of the user; and
generating, based on the at least one of the design, the color combination, the texture, or the print pattern based on the clothing article, and on the identified device and the three-dimensional scan of the user, the display of the plurality of three-dimensional hologram images of the user wearing the at least one of the design, the color combination, the texture, or the print pattern.

6. The apparatus according to claim 1, wherein
the artificial intelligence controller is executed by the at least one hardware processor to ascertain the selection of the clothing article from the displayed plurality of three-dimensional hologram images of the user wearing the at least one of the design, the color combination, the texture, or the print pattern, and determine personalized clothing articles for the user based on the selection of the clothing article from the displayed plurality of three-dimensional hologram images of the user wearing the at least one of the design, the color combination, the texture, or the print pattern by
ascertaining the selection of the clothing article based on the most viewed image of the clothing article, and
determining the personalized clothing articles for the user based on the selection of the clothing article from the displayed plurality of three-dimensional hologram images of the user wearing the at least one of the design, the color combination, the texture, or the print pattern.

7. A method for immersive and artificial intelligence based retail comprising:
ascertaining, by a user analyzer that is executed by at least one hardware processor, a plurality of attributes associated with a user;
identifying, by a virtual store generator that is executed by the at least one hardware processor, a device to display at least one of an augmented reality display, a virtual reality display, or a mixed reality display;
generating, by the virtual store generator that is executed by the at least one hardware processor, based on the ascertained plurality of attributes associated with the user and for display on the identified device, a virtual store including a plurality of clothing articles;
generating, by the virtual store generator that is executed by the at least one hardware processor, for the virtual store, voice enabled price details with respect to the plurality of clothing articles;
ascertaining, by a clothing selector that is executed by the at least one hardware processor, based on a direction of a gaze, selection of a clothing article from the plurality of clothing articles;
generating, by the clothing selector that is executed by the at least one hardware processor, based on the selection of the clothing article, at least one of a design, a color combination, a texture, or a print pattern based on the clothing article;
generating, by a hologram generator that is executed by the at least one hardware processor, based on the at least one of the design, the color combination, the texture, or the print pattern based on the clothing article, and for the identified device, a display of a plurality of three-dimensional hologram images of the user wearing the at least one of the design, the color combination, the texture, or the print pattern;
identifying, by the hologram generator that is executed by the at least one hardware processor, a most viewed image of the clothing article by
determining an attraction factor as a frequency of returning the gaze of the user in a direction of the clothing article relative to the plurality of clothing articles, and
determining an affinity factor as a ratio of time spent by the user gazing in the direction of the clothing article relative to the plurality of clothing articles;
ascertaining, by an artificial intelligence controller that is executed by the at least one hardware processor, selection of the clothing article from the displayed plurality of three-dimensional hologram images of the user wearing the at least one of the design, the color combination, the texture, or the print pattern;

determining, by the artificial intelligence controller that is executed by the at least one hardware processor, personalized clothing articles for the user based on the selection of the clothing article from the displayed plurality of three-dimensional hologram images of the user wearing the at least one of the design, the color combination, the texture, or the print pattern;

ascertaining, by the artificial intelligence controller that is executed by the at least one hardware processor, an importance weight for the clothing article associated with the determined attraction factor and the determined affinity factor;

determining, by the artificial intelligence controller that is executed by the at least one hardware processor, based on the importance weight, an importance score for the clothing article associated with the determined attraction factor and the determined affinity factor as a weighted average of the attraction factor and the affinity factor;

prioritizing, by the artificial intelligence controller that is executed by the at least one hardware processor, for the user, based on the importance score, the clothing article associated with the determined attraction factor and the determined affinity factor relative to the plurality of clothing articles; and generating, by a clothing article generator that is executed by the at least one hardware processor, based on the determined personalized clothing articles for the user, at least one of the determined personalized clothing articles.

8. The method according to claim 7, further comprising:
generating, by a virtual online catalog generator that is executed by the at least one hardware processor, based on the ascertained plurality of attributes associated with the user, a virtual online catalog including the plurality of clothing articles displayed on at least one page of the virtual online catalog.

9. The method according to claim 7, wherein an attribute of the plurality of attributes associated with the user includes an image of a face of the user, and wherein generating, by the hologram generator, based on the at least one of the design, the color combination, the texture, or the print pattern based on the clothing article, and for the identified device, the display of the plurality of three-dimensional hologram images of the user wearing the at least one of the design, the color combination, the texture, or the print pattern further comprises:

generating, based on the at least one of the design, the color combination, the texture, or the print pattern based on the clothing article, and for the identified device, the display of the plurality of three-dimensional hologram images that include the face of the user and the user wearing the at least one of the design, the color combination, the texture, or the print pattern.

10. The method according to claim 7, wherein generating, by the hologram generator, based on the at least one of the design, the color combination, the texture, or the print pattern based on the clothing article, and for the identified device, the display of the plurality of three-dimensional hologram images of the user wearing the at least one of the design, the color combination, the texture, or the print pattern further comprises:

performing a three-dimensional scan of the user; and
generating, based on the at least one of the design, the color combination, the texture, or the print pattern based on the clothing article, and for the identified device and based on the three-dimensional scan of the user, the display of the plurality of three-dimensional hologram images of the user wearing the at least one of the design, the color combination, the texture, or the print pattern.

11. The method according to claim 7, further comprising:
ascertaining, by the artificial intelligence controller that is executed by the at least one hardware processor, the selection of the clothing article from the displayed plurality of three-dimensional hologram images of the user wearing the at least one of the design, the color combination, the texture, or the print pattern, and determining, by the artificial intelligence controller that is executed by the at least one hardware processor, personalized clothing articles for the user based on the selection of the clothing article from the displayed plurality of three-dimensional hologram images of the user wearing the at least one of the design, the color combination, the texture, or the print pattern by ascertaining the selection of the clothing article based on the most viewed image of the clothing article, and determining the personalized clothing articles for the user based on the selection of the clothing article from the displayed plurality of three-dimensional hologram images of the user wearing the at least one of the design, the color combination, the texture, or the print pattern.

12. A non-transitory computer readable medium having stored thereon machine readable instructions, the machine readable instructions, when executed by at least one hardware processor, cause the at least one hardware processor to:

ascertain a plurality of attributes associated with a user;
identify a device to display at least one of an augmented reality display, a virtual reality display, or a mixed reality display;

generate, based on the ascertained plurality of attributes associated with the user and for display on the identified device, a virtual store including a plurality of clothing articles;

generate, for the virtual store, voice enabled price details with respect to the plurality of clothing articles;

ascertain, based on a direction of a gaze, selection of a clothing article from the plurality of clothing articles;

generate, based on the selection of the clothing article, at least one of a design, a color combination, a texture, or a print pattern based on the clothing article;

generate, based on the at least one of the design, the color combination, the texture, or the print pattern based on the clothing article, and on the identified device, a display of a plurality of three-dimensional hologram images of the user wearing the at least one of the design, the color combination, the texture, or the print pattern;

identify a most viewed image of the clothing article by determining an attraction factor as a frequency of returning the gaze of the user in a direction of the clothing article relative to the plurality of clothing articles, and determining an affinity factor as a ratio of time spent by the user gazing in the direction of the clothing article relative to the plurality of clothing articles;

ascertain selection of the clothing article from the displayed plurality of three-dimensional hologram images of the user wearing the at least one of the design, the color combination, the texture, or the print pattern;
determine personalized clothing articles for the user based on the selection of the clothing article from the displayed plurality of three-dimensional hologram images of the user wearing the at least one of the design, the color combination, the texture, or the print pattern;
ascertain an importance weight for the clothing article associated with the determined attraction factor and the determined affinity factor;
determine, based on the importance weight, an importance score for the clothing article associated with the determined attraction factor and the determined affinity factor as a weighted average of the attraction factor and the affinity factor; and
prioritize, for the user, based on the importance score, the clothing article associated with the determined attraction factor and the determined affinity factor relative to the plurality of clothing articles.

13. The non-transitory computer readable medium according to claim 12, wherein an attribute of the plurality of attributes associated with the user includes an image of a face of the user, and wherein the machine readable instructions to generate, based on the at least one of the design, the color combination, the texture, or the print pattern based on the clothing article, and for the identified device, the display of the plurality of three-dimensional hologram images of the user wearing the at least one of the design, the color combination, the texture, or the print pattern, when executed by at least one hardware processor, further cause the at least one hardware processor to:
generate, based on the at least one of the design, the color combination, the texture, or the print pattern based on the clothing article, and for the identified device, the display of the plurality of three-dimensional hologram images that include the face of the user and the user wearing the at least one of the design, the color combination, the texture, or the print pattern.

14. The non-transitory computer readable medium according to claim 12, wherein the machine readable instructions to generate, based on the at least one of the design, the color combination, the texture, or the print pattern based on the clothing article, and for the identified device, the display of the plurality of three-dimensional hologram images of the user wearing the at least one of the design, the color combination, the texture, or the print pattern, when executed by at least one hardware processor, further cause the at least one hardware processor to:
perform a three-dimensional scan of the user; and
generate, based on the at least one of the design, the color combination, the texture, or the print pattern based on the clothing article, and for the identified device and based on the three-dimensional scan of the user, the display of the plurality of three-dimensional hologram images of the user wearing the at least one of the design, the color combination, the texture, or the print pattern.

15. The non-transitory computer readable medium according to claim 12, wherein the machine readable instructions, when executed by the at least one hardware processor, further cause the at least one hardware processor to:
ascertain the selection of the clothing article from the displayed plurality of three-dimensional hologram images of the user wearing the at least one of the design, the color combination, the texture, or the print pattern, and determine personalized clothing articles for the user based on the selection of the clothing article from the displayed plurality of three-dimensional hologram images of the user wearing the at least one of the design, the color combination, the texture, or the print pattern by
ascertaining the selection of the clothing article based on the most viewed image of the clothing article, and
determining the personalized clothing articles for the user based on the selection of the clothing article from the displayed plurality of three-dimensional hologram images of the user wearing the at least one of the design, the color combination, the texture, or the print pattern.

\* \* \* \* \*